(12) United States Patent
Weber et al.

(10) Patent No.: US 9,513,176 B1
(45) Date of Patent: Dec. 6, 2016

(54) COMPLIANT FORCE SENSOR FOR ROBOT ACTUATION

(71) Applicant: Meka Robotics, LLC, San Francisco, CA (US)

(72) Inventors: Jeff Weber, San Francisco, CA (US); Aaron Edsinger, San Francisco, CA (US); Andy Metzger, San Francisco, CA (US)

(73) Assignee: Meka Robotics, LLC, San Francisco, CA (US)

( * ) Notice: Subject to any disclaimer, the term of this patent is extended or adjusted under 35 U.S.C. 154(b) by 108 days.

(21) Appl. No.: 14/292,979

(22) Filed: Jun. 2, 2014

Related U.S. Application Data (60) Provisional application No. 61/838,508, filed on Jun. 24, 2013.

(51) Int. Cl.
*G01L 3/08* (2006.01)
*G01L 1/04* (2006.01)
*G01L 3/04* (2006.01)

(52) U.S. Cl.
CPC .. *G01L 1/04* (2013.01); *G01L 3/04* (2013.01)

(58) Field of Classification Search
CPC ............... G01L 3/08; G01L 1/22; G01L 1/04; G01L 3/14
USPC ..................................... 73/862.627, 862.321
See application file for complete search history.

(56) References Cited

U.S. PATENT DOCUMENTS

| | | | | |
|---|---|---|---|---|
| 5,049,797 A * | 9/1991 | Phillips | .................. | B25J 9/1635 318/568.16 |
| 8,435,309 B2 * | 5/2013 | Gilbert | .................... | A61F 2/582 623/24 |
| 8,875,584 B2 * | 11/2014 | Sasajima | ................. | G01L 1/005 73/774 |
| 9,239,100 B1 * | 1/2016 | Weber | ..................... | F16H 19/08 |
| 2010/0185324 A1 * | 7/2010 | Ferrara | .................. | B25J 9/1638 700/245 |
| 2011/0088489 A1 * | 4/2011 | Yamamoto | ............ | G01L 1/2218 73/862.627 |
| 2012/0296472 A1 * | 11/2012 | Nagai | .................... | B25J 9/1612 700/258 |

* cited by examiner

*Primary Examiner* — Lisa Caputo
*Assistant Examiner* — Octavia Hollington
(74) *Attorney, Agent, or Firm* — McDonnell Boehnen Hulbert & Berghoff LLP (57) ABSTRACT

Example embodiments may relate to a compliant force sensor used in actuated and non-actuated systems. For instance, a structure (e.g., a transmission) may be configured to receive a force based on application of a load to the structure. A rigid member may be coupled to the structure and configured to provide a first deformation based on application of the load to the structure and transfer of the force to the rigid member. An elastic element may provide compliance and may be connected to the rigid member such that the rigid member is configured to further transfer the force to the elastic element. The elastic member may be configured to provide a second deformation under application of the load that is larger than the first deformation. A sensor may be positioned on the rigid member and configured to measure the first deformation independent of hysteresis and non-linearity in the elastic element.

20 Claims, 10 Drawing Sheets

COMPLIANT FORCE SENSOR FOR ROBOT ACTUATION

CROSS REFERENCE TO RELATED APPLICATION

The present application claims priority to U.S. Provisional patent application Ser. No. 61/838,508 filed on Jun. 24, 2013 and entitled "Compliant Force Sensor for Robot Actuation," the entire contents of which are herein incorporated by reference.

BACKGROUND

Unless otherwise indicated herein, the materials described in this section are not prior art to the claims in this application and are not admitted to be prior art by inclusion in this section.

Robotic systems may be used for applications involving material handling, welding, assembly, and dispensing, among others. Over time, the manner in which these robotic systems operate is becoming more intelligent, more efficient, and more intuitive. As robotic systems become increasingly prevalent in numerous aspects of modern life, the need for human safe robotic systems becomes apparent. Therefore, a demand in human safe robotics has helped open up a field of innovation in sensing techniques, actuators, as well as component design and assembly.

SUMMARY

Example embodiments may relate to a compliant force sensor used in actuated and non-actuated systems. For instance, a structure (e.g., a transmission) may be configured to receive a force based on application of a load to the structure. A rigid member may be coupled to the structure and configured to provide a first deformation based on application of the load to the structure and transfer of the force to the rigid member. An elastic element may provide compliance and may be connected to the rigid member such that the rigid member is configured to further transfer the force to the elastic element. The elastic member may be configured to provide a second deformation under application of the load that is larger than the first deformation. A sensor may be positioned on the rigid member and configured to measure the first deformation independent of hysteresis and non-linearity in the elastic element.

In one aspect, a system is provided. The system includes a structure configured to receive a force based on application of a load to the structure. The system also includes a rigid member coupled to the structure and configured to provide a first deformation based on application of the load to the structure, and based on transfer of the force to the rigid member. The system additionally includes a sensing element positioned on the rigid member, where the sensing element is configured to measure the first deformation. The system further includes a shock absorbing member connected to the rigid member such that the rigid member is configured to further transfer the force to the shock absorbing member, and where the shock absorbing member is configured to provide a second deformation under application of the load that is larger than the first deformation.

In another aspect, a second system is provided. The system includes a transmission assembly configured to rotate based on application of a load to the transmission assembly. The system also includes a rigid member comprising a material having a first elastic modulus, where the rigid member is coupled to the transmission assembly such that a rotation of the transmission assembly causes the rigid member to provide a first deformation based on application of the load. The system additionally includes a sensing element positioned on the rigid member, where the sensing element is configured to measure the first deformation. The system further includes an elastic element connected to the rigid member such that the rotation of the transmission assembly causes the elastic element to provide a second deformation based on application of the load, where the elastic element comprises a material having a second elastic modulus, and where the first elastic modulus is higher than the second elastic modulus.

In yet another aspect, a third system is provided. The system includes a motor configured to apply a torque. The system also includes a transmission assembly connected to the motor such that the transmission assembly is configured to rotate based on an application of the torque by the motor. They system additionally includes a plurality of rigid members comprising a material having a first elastic modulus, where the rigid members are coupled to the transmission assembly such that a rotation of the transmission assembly causes the transmission assembly to transfer a force to the rigid members based on application of the torque. The system further includes a plurality of sensors each positioned on one of the rigid members such that each sensor is configured to measure a deformation of one of the rigid members. The system yet further includes a plurality of shock absorbing members each connected to one of the rigid members such that the rigid members are configured to further transfer the force to the shock absorbing members, where the shock absorbing members comprise a material having a second elastic modulus, and where the first elastic modulus is higher than the second elastic modulus.

These as well as other aspects, advantages, and alternatives will become apparent to those of ordinary skill in the art by reading the following detailed description, with reference where appropriate to the accompanying drawings.

DETAILED DESCRIPTION

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

According to various embodiments, described herein are systems involving a compliant force sensor for use in both actuated and non-actuated systems. An actuator is a mechanism that may be used to introduce mechanical motion. In robotic systems, actuators may be configured to convert stored energy into movement of various parts of the robotic system. For example, in humanoid robots, actuators may be responsible for movement of robotic arms, legs, and head, among others.

Additionally, various mechanisms may be used to power an actuator. For instance, actuators may be powered by chemicals, compressed air, or electricity, among other possibilities. Further, in some cases, an actuator may be a rotary actuator that may be used in systems involving rotational forms of motion (e.g., a joint in a humanoid robot). However, in other cases, an actuator may be a linear actuator that may be used in systems involving straight line motion.

An example rotary actuator may include a transmission assembly connected a rigid element. The rigid element may be further connected to an elastic element that may be configured to provide compliance as a shock absorbing member. A load applied to an output plate of the transmission assembly may cause a rotary deflection of the transmission assembly. Alternatively, a motor may apply a torque to the transmission assembly, thereby causing a rotary deflection of the transmission assembly.

A rotation of the transmission assembly may cause a deflection of the rigid and elastic elements (i.e., a deformation under the load/torque). Consequently, a sensor may be positioned on the rigid element to measure the deformation of the rigid element under the load. The deformation of the rigid element may correspond to the rotary deflection of the transmission assembly, thereby corresponding to the load/torque. Further, the sensor may be configured to measure the deformation independent of hysteresis and non-linearity in the elastic element.

II. EXAMPLE COMPLIANT FORCE SENSOR FOR ROBOT ACTUATION

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

Figure 1:
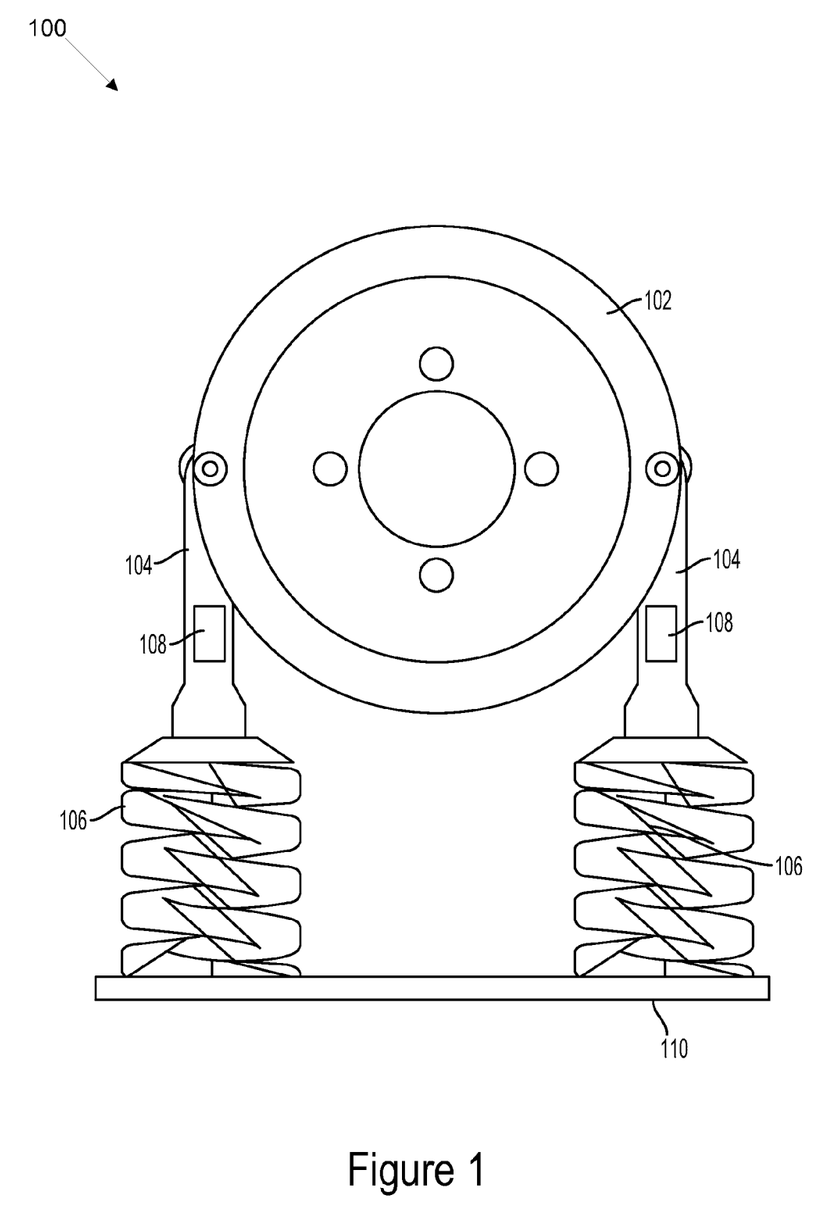
FIG. 1 illustrates an example configuration of a rotary actuator where a compliant force sensor may be implemented, according to an example embodiment.

Referring now to the figures, FIG. 1 shows an example configuration of a rotary actuator 100 where a compliant force sensor may be implemented. The rotary actuator 100 may include a motor (not shown), a transmission assembly 102, an output plate (not shown) connected to the transmission assembly 102, a rigid element 104 (may also be referred to as a rigid member), an elastic element 106, a sensor 108, and a ground plate 110 (e.g., connected to a chassis).

The motor may be a brushed DC motor, a brushless DC motor, or an AC motor such as a synchronous electric motor or an induction motor, among other possibilities. In particular, the motor may include a motor shaft, a stationary stator, and a rotor coupled to the motor shaft such that the motor shaft is configured to deliver mechanical power (e.g., apply a torque) to the transmission assembly 102, thereby causing a rotation of the transmission assembly 102.

More specifically, the stator may be a stationary part of motor. For example, the stator may include an electromagnet and a coil including windings that can be composed of any conductive material. On the other hand, the rotor may be a non-stationary portion of the motor and may include conductors that interact with a magnetic field produced by the windings in the stator. Such an interaction may result in the development of a torque that can cause a rotation of the rotor about an axis, thereby allowing the motor shaft to deliver mechanical power. Other components may also be included and additional motor configurations may also be possible.

The transmission assembly 102 may be configured to transmit mechanical power from the motor to a load. Alternatively, a torque may be applied to the transmission assembly 102 via application of a load to the output plate of the transmission assembly 102 such that the transmission assembly 102 received a force based on application of the load. Additionally, the transmission assembly 102 may include a casing, a gearbox, clutch, differential, drive shafts, and/or other elements. In particular, the transmission assembly casing may be composed of any rigid material (e.g., aluminum or steel) and may be configured to surround the internal components of the transmission assembly 102 such that the internal components are protected. Further, the transmission assembly 102 may include a harmonic drive (may also be referred to as "strain wave gearing") that may be used for gear reduction, increaser gearing, and/or differential gearing. Other configurations are also possible for the transmission assembly.

As shown in FIG. 1, a rigid element 104 may be connected to the transmission assembly 102 on one end and to a elastic element 106 on the other end. Additionally, the elastic element 106 may be connected to the rigid element 104 on one end and to the ground plate 110 on the other end. Any type of connection may be used to connect the elements of the rotary actuator 100. Further, as shown in FIG. 1, the rotary actuator 100 may have two rigid elements 104 and two elastic elements 106. However, any number of elements may be used.

Elements 104 and 106 may be positioned such that a rotary deflection of the transmission assembly 102 causes a linear deflection of the rigid element 104 and/or a linear deflection of the elastic element 106. In other words, a force may be transferred to the rigid element 104 and then further transferred to the elastic element 106. Such a configuration may allow for a rocker arm mechanism where the deflection of elements 104 and 106 may be proportional to the torque applied to the transmission assembly 102. Note that the elastic element 106 is shown in FIG. 1 configured as a spring. However, as further discussed below, other types of elastic elements may be used. Other configurations may also be possible.

Figure 2:
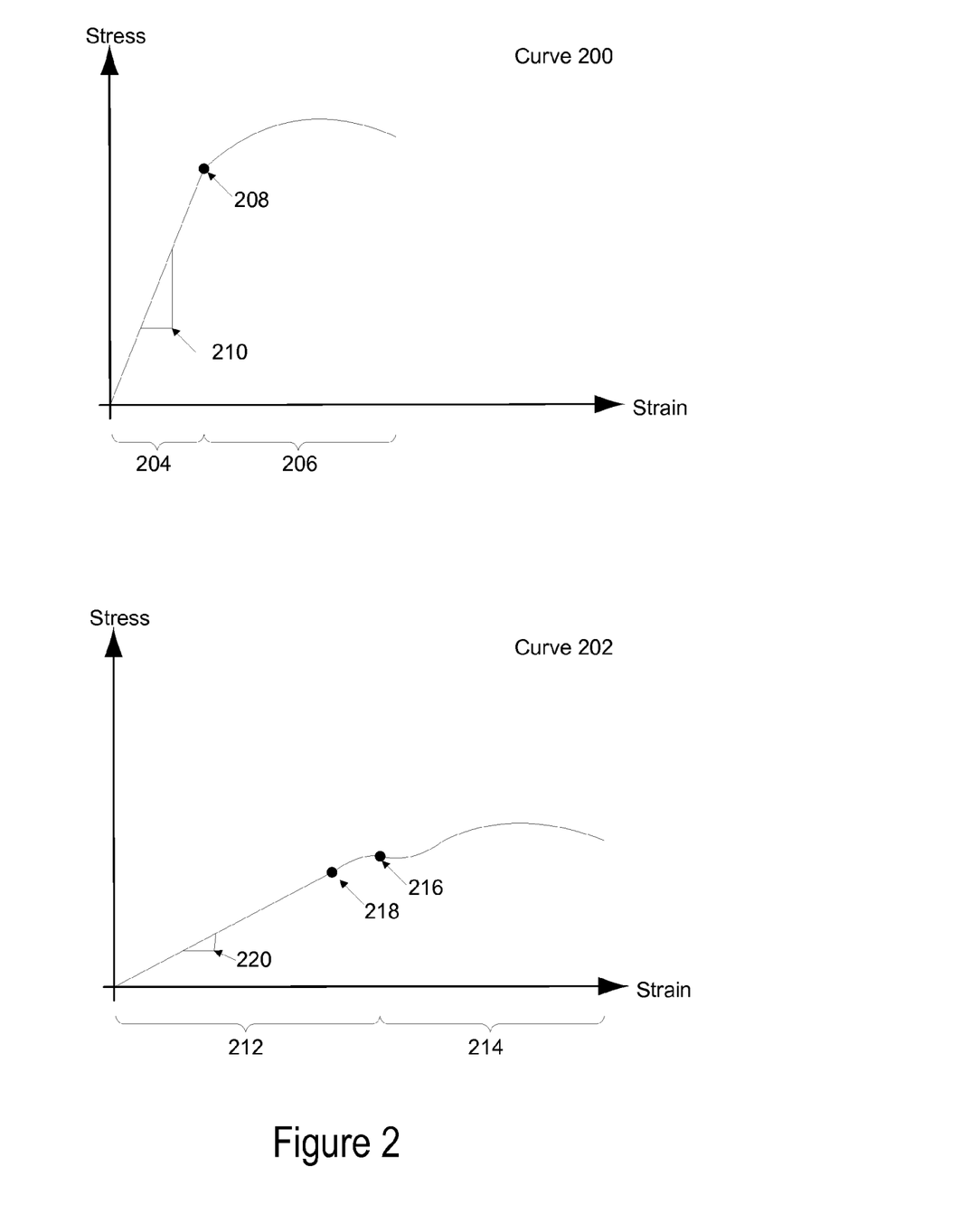
FIG. 2 illustrates example stress-strain curves, according to an example embodiment.

The rigid element 104 may be composed of any material of high elastic modulus (i.e., a stiffer material) operating in a linear region of its stress-strain properties such as, for example, aluminum or steel. On the other hand, the elastic element 106 may be composed of any material of a low elastic modulus (not necessarily operating in a linear region of its stress-strain properties). As a result, a deformation of the elastic element 106 under application of a load may be larger than a deformation of the rigid element 104 under application of the load. To illustrate, consider FIG. 2 showing example stress-strain curves 200 and 202. Note that FIG. 2 is shown for illustration purposes only and is not meant to be limiting.

Curve 200 illustrates an example stress-strain curve for a material of high elastic modulus (e.g., used for the rigid element 104). In particular, curve 200 illustrates the elastic region 204 of the material, where the material may return to an original size and shape when stress is removed. The curve 200 also illustrates the plastic region 206 of the material, where the material may permanently deform due to stress. Point 208 illustrates the yield strength of the material such that stress applied beyond point 208 may cause the material behavior to transition from the elastic region 204 to the plastic region 206.

As shown, the curve 200 may be linear up to point 208 (i.e., in the elastic region 204) as illustrated by slope 210. The slope 210 may represent the elastic modulus as the change in strain of the material as stress is applied. In this case, the slope 210 is steep, thereby representing a material of high elastic modulus. In other words, as stress increases on the material (while in the elastic region 204), strain may be experienced by the material at a relatively slow rate.

In contrast, curve 202 illustrates an example stress-strain curve for a material of low elastic modulus (e.g., used for the elastic element 106). In particular, curve 202 illustrates the elastic region 212 of the material, where the material may return to an original size and shape when stress is removed. The curve 202 also illustrates the plastic region 214 of the material, where the material may permanently deform due to stress. Point 216 illustrates the yield strength of the material such that stress applied beyond point 216 may cause the material behavior to transition from the elastic region 212 to the plastic region 214.

As shown, the curve 202 may be linear up to point 218. In particular, point 218 illustrates the proportional limit of the material where stress applied below the proportional limit may allow the material to experience linearity in the stress-strain properties. On the other hand, stress applied between point 218 and 216 may allow the material to remain in the elastic region 212 but the material may experience non-linearity in the stress-strain properties. Note that curve 202 is shown for illustration purposes only. Also, note that a material may experience any combination of linearity and non-linearity in the elastic region.

The linear region of the material (i.e., where stress is applied below point 218) may be illustrated by slope 220. The slope 220 may represent the elastic modulus as the change in strain of the material as stress is applied. In this case, the slope 220 is not as steep as slope 210 of curve 200, thereby representing a material of low elastic modulus. In other words, as stress increases on the material (while in the elastic region 212), strain may be experienced by the material at a higher rate. Other illustrations may also be possible.

Within example operation, when a counter-clockwise torque is applied to the transmission assembly 102 shown in FIG. 1, the left spring (i.e., the elastic element 106 on the left) may be at least partially compressed and the right spring (i.e., the elastic element 106 on the right) may be at least partially extended. As torque is applied, a constant load path may be experienced from the ground plate 110 through the rocker arm. The load can be measured by measuring the strain in the rigid element 104 or by measuring the deflection of the elastic element 106, among other possibilities. Such measurements may correspond to a rotary deflection of the transmission assembly 102.

As shown in FIG. 1, a sensor 108 may be positioned on one or more of rigid elements 104 such that the sensor 108 experiences the load and produce a signal proportional to the load. More specifically, the sensor 108 may be configured to measure the torque applied to the transmission assembly 102 by a measurement of the deflection of the rigid element 104. In one example, the sensor 108 may be a strain gauge directly positioned on the rigid element 104 to result in a strain gauge load cell configuration. The strain gauge may be configured to measure the strain in the rigid element 104 as stress is applied. In particular, the force experienced by the rigid element 104 may result in a deformation of the strain gauge, where the deformation may be measured as an electrical signal because the resistance of the strain gauge changes due to strain in the rigid element 104. Additionally, any number of strain gauges may be used. For instance, four strain gauges may be used (i.e., a Wheatstone bridge) to improve accuracy. Further, other types of load cells, such as piezoelectric or hydraulic, may also be used.

In an example embodiment, positioning the sensor 108 on the rigid element 104 may be desirable because a load can be measured independent of any possible non-linearity in the elastic element 106. As mentioned above in association with FIG. 2, under a given stress, the elastic element 106 may experience non-linearity in its stress-strain properties. On the other hand, under the same stress, the rigid element 104 may operate in the linear region of its stress-strain properties. As a result, positioning the sensor 108 to measure the strain of the rigid element 104 may allow for linear force sensing.

Additionally, note that measuring the deflection of the elastic element 106 may be undesirable because an elastic element 106 may have to be obtained to match the range and resolution of a deflection sensor (e.g., a capacitive sensor since a strain gauge is generally not used to measure higher deflection), thereby leading to lower stiffness values and a lower control bandwidth.

In an example embodiment, positioning the sensor 108 on the rigid element 104 may also be desirable because a load can be measured independent of any possible hysteresis in the elastic element 106. As mentioned above, when a load is applied to an elastic element 106, such as a spring, the spring may be compressed. However, when the load is removed, the spring may not return to its natural set point (i.e., the same position the spring held prior to application of the load), which may result in hysteresis of the spring. On the other hand, the rigid element 104 may not experience hysteresis, thereby allowing for measurement of the force signal independent of hysteresis in the elastic element 106.

Further, the elastic element 106 may provide compliance and force control in order to reduce the risk of damage or failure to the sensor 108, the rigid element 104, and/or the transmission assembly 102. For instance, the rotary actuator 100 may experience shock loads or overloading. In this case, the elastic element 106 may be configured as a shock absorbing element by isolating the transfer of shock loads, vibration, and/or high forces. To illustrate, consider FIGS. 3A-3B illustrating how the elastic element 106 may be configured to absorb shock loads.

Figure 3A:
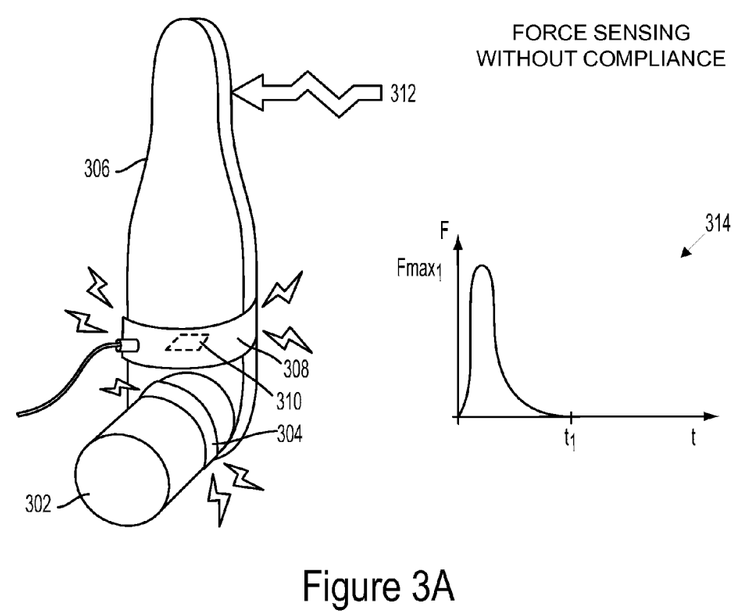
FIGS. 3A-3B illustrate how an elastic element may protect a system against shock loads, according to an example embodiment.

FIG. 3A shows an actuator 302 that includes a transmission 304 but does not include an elastic element. The actuator 302 may be connected to a solid member 306 (e.g., a robot link) such that a motor of the actuator 302 causes a movement of the solid member 306. A load cell 308 that includes one or more strain gauges 310 may be positioned on the solid member 306 and configured to measure a force applied to the solid member 306.

As illustrated by Figured 3A, a shock load 312 applied to the solid member 306 may cause damage to the load cell 310 and/or the transmission 304 as well as other components. Graph 314 illustrates the force experienced by the transmission 304 over time. More specifically, a high force Fmax1 is experienced over a short period of time t1 by the transmission 304, which may result in damage or failure of the transmission 304. Note that the graph 314 is shown for illustration purposes only and is not meant to be limiting.

Figure 3B:
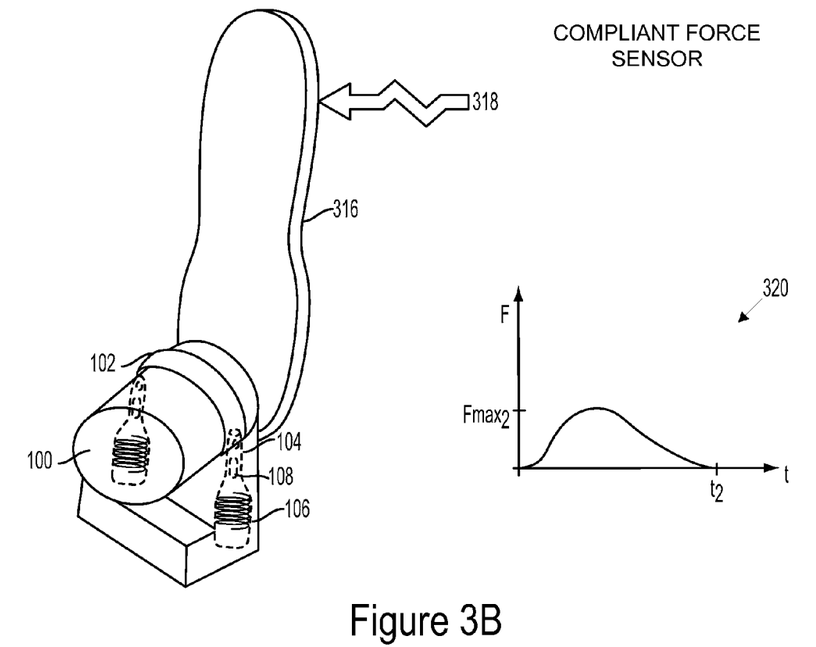

In contrast, FIG. 3B shows the rotary actuator 100 as introduced by FIG. 1. The rotary actuator 100 is shown to include the elastic elements 106 and may be connected to a solid member 316 (e.g., a robot link) such that the motor of the rotary actuator 100 causes a movement of the solid member 316. As illustrated by FIG. 3B, a shock lock 318 (e.g., of the same magnitude as shock load 312) may be applied to the solid member 316. However, in this case, no damage may be caused to the transmission assembly 102, the rigid element 104, and the sensor 108 because a grounding of the load path may occur through the elastic element 106. The grounding of the load path through the elastic element 106 may occur because the elastic element 106 may need to be displaced a predetermined distance before transmitting the load.

Graph 320 illustrates the force experienced by the transmission assembly 102 over time. Contrary to graph 314, a lower force Fmax2 is experienced over a longer period of time t2 by the transmission assembly 102, thereby avoiding damage to the transmission assembly 102. The elastic element 106 may behave as a low-pass filter and provide compliance by increasing the time a force is applied to the transmission assembly 102, the rigid element 104, and/or the sensor 108 (i.e., t2>t1). As a result, the elastic element 106 may decrease the maximum force experienced over that time period (i.e., Fmax2<Fmax1). Note that the graph 320 is shown for illustration purposes only and is not meant to be limiting.

Figure 4A:
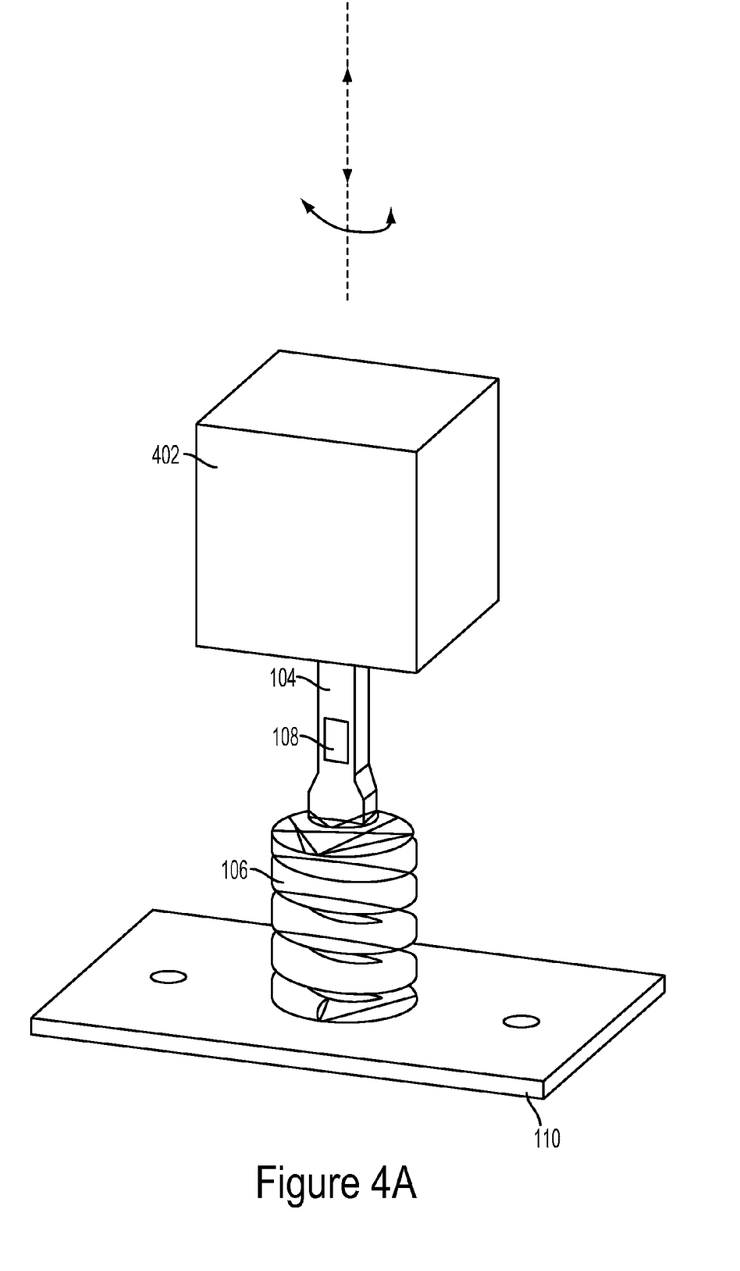
FIG. 4A illustrates another configuration for compliant force sensing, according to an example embodiment.
Figure 4B:
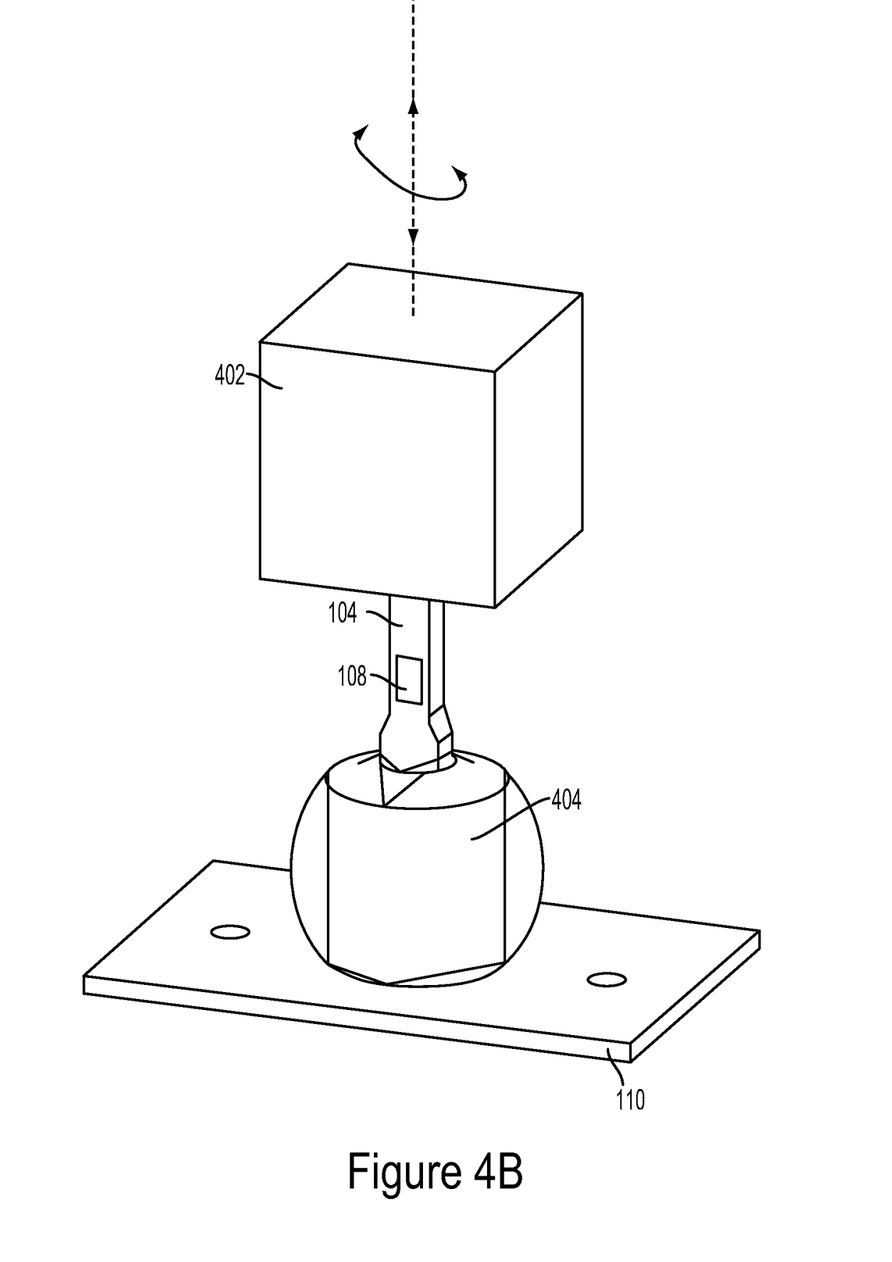
FIG. 4B illustrates yet another configuration for compliant force sensing, according to an example embodiment.
Figure 4C:
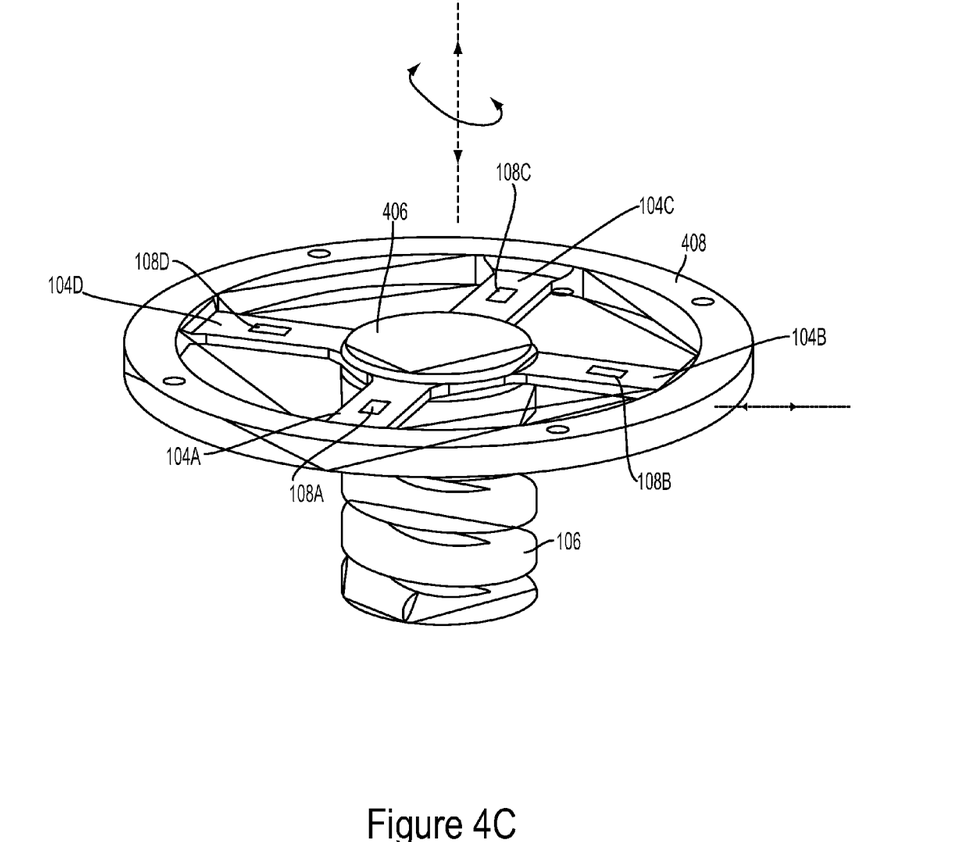
FIG. 4C illustrates yet another configuration for compliant force sensing, according to an example embodiment.

FIGS. 4A-4C show additional example configurations for compliant force sensing. Compliant force sensing may be used for both actuated and non-actuated systems. For instance, FIG. 4A shows a configuration where a structure 402 (e.g., other than a transmission assembly) may be connected to the rigid element 104. The rigid element 104 may be connected on one end to the structure 402 and on the other end to the elastic element 106. Additionally, the elastic element 106 may be connected on one end to the rigid element 104 and on the other end to the ground plate 110. An external force (e.g., non-actuated) may be received by the structure 402, where the force may be linear and/or rotational. The elastic element 106 may provide compliance in either degree of freedom. Further, the sensor 108 positioned on the rigid element 104 may be used to measure both linear forces and rotational forces.

FIG. 4B shows the configuration discussed above in association with FIG. 4A. However, in this case, the elastic element may be a bumper 404 rather than a spring. For example, bumper 404 may be a urethane bumper or a cylinder piston configuration compressing a fluid (e.g., air or oil). Additional examples of elastic elements, such as machined springs, may also be possible.

FIG. 4C shows an example configuration where four rigid elements 104A-104D (configured as the rigid element 104 described above) are positioned between structures 406 and 408, where structure 406 is connected to the elastic element 106. Linear and/or rotary forces may be applied to structures 406 and 408. In one case, a rotary force applied to structure 408 may cause the elastic element 106 to act as a torsion spring while providing compliance. In another case, a linear force (i.e., uniaxial) applied to structure 408 may cause the elastic element 106 to bend while providing compliance. In yet another case, a linear force applied to structure 406 may cause the elastic element to compress or extend while providing compliance. In all cases, the sensors 108A-108D (configured as the sensor 108 described above) positioned on the rigid elements 104A-104D may provide measurements for forces applied in any degree of freedom.

The configurations shown in FIGS. 1-4C are for illustration purposes only and are not meant to be limiting. Other examples configurations involving compliant force sensing may also be possible.

Figure 5:
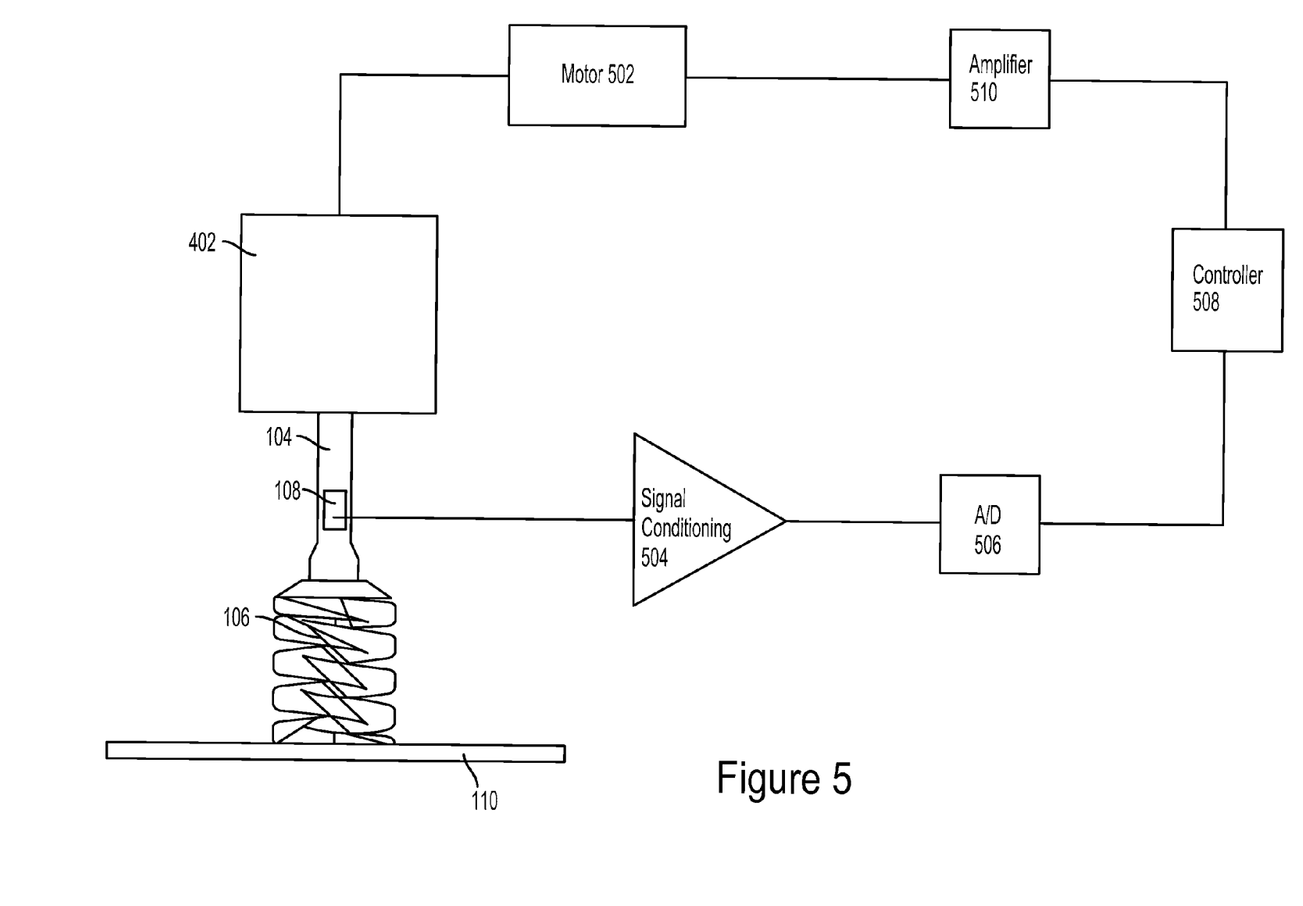
FIG. 5 illustrates an implementation of compliant force sensing in a feedback loop, according to an example embodiment.

FIG. 5 shows an example block diagram of an implementation of compliant force sensing in a feedback loop. In particular, FIG. 5 shows an implementation of the compliant force sensing configuration shown in FIG. 4A. However, any of the configurations discussed above may be implemented in a feedback loop. As shown, a motor 502 may be connected to the structure 402 and may be configured to exert a force on the structure 402. The effort exerted by the motor 502 may be determined by the sensor 108 by measuring the deflection of the rigid element 104. Note that the elastic element 106 may provide compliance as the force is exerted.

The feedback loop may include signal conditioning 504 connected to the sensor 108. An output analog signal of sensor 108, representing a measurement of the deformation of the rigid element 104, may be transmitted to signal conditioning 504. Signal conditioning 504 may involve filtering and/or amplification of the analog signal. For instance, operational amplifiers may be employed to carry out amplification of the analog signal. After the signal conditioning 504 stage, the signal may be sent to an analog-to-digital converter (A/D) 506 that may be configured to convert the analog signal to a digital signal. Any type of analog-to-digital converter may be used.

The digital signal may be transmitted to a controller 508. The controller 508 may be, for example, a programmable microcontroller configured to modulate the effort exerted by the motor 502 based on the output signal of the sensor 108. In particular, the controller 508 may output an analog signal that may be amplified by an amplifier 510 and then transmitted to the motor 502. Other configurations may also be used for implementing compliant force sensing in a feedback loop.

Figure 6A:
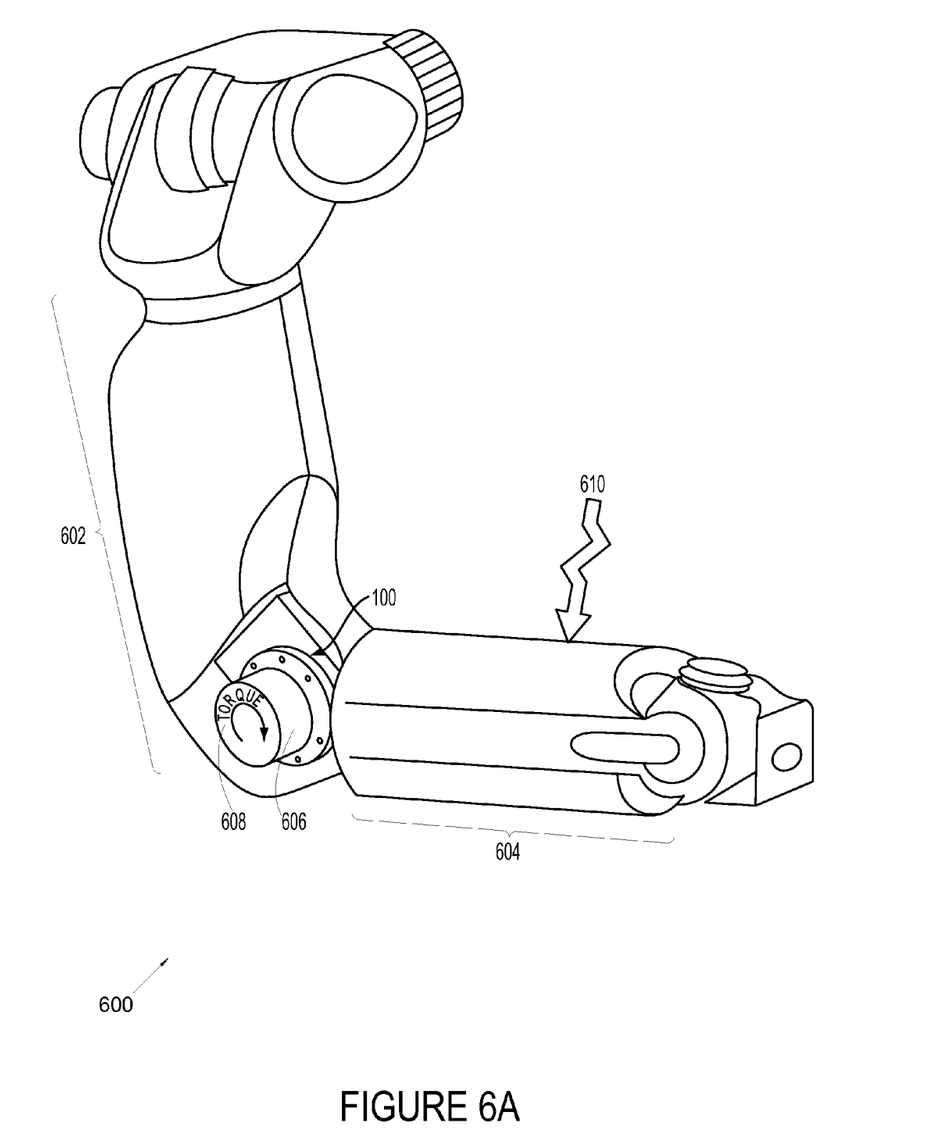
FIGS. 6A-6C illustrate example implementations of compliant force sensing in a robotic system, according to an example embodiment.
Figure 6B:
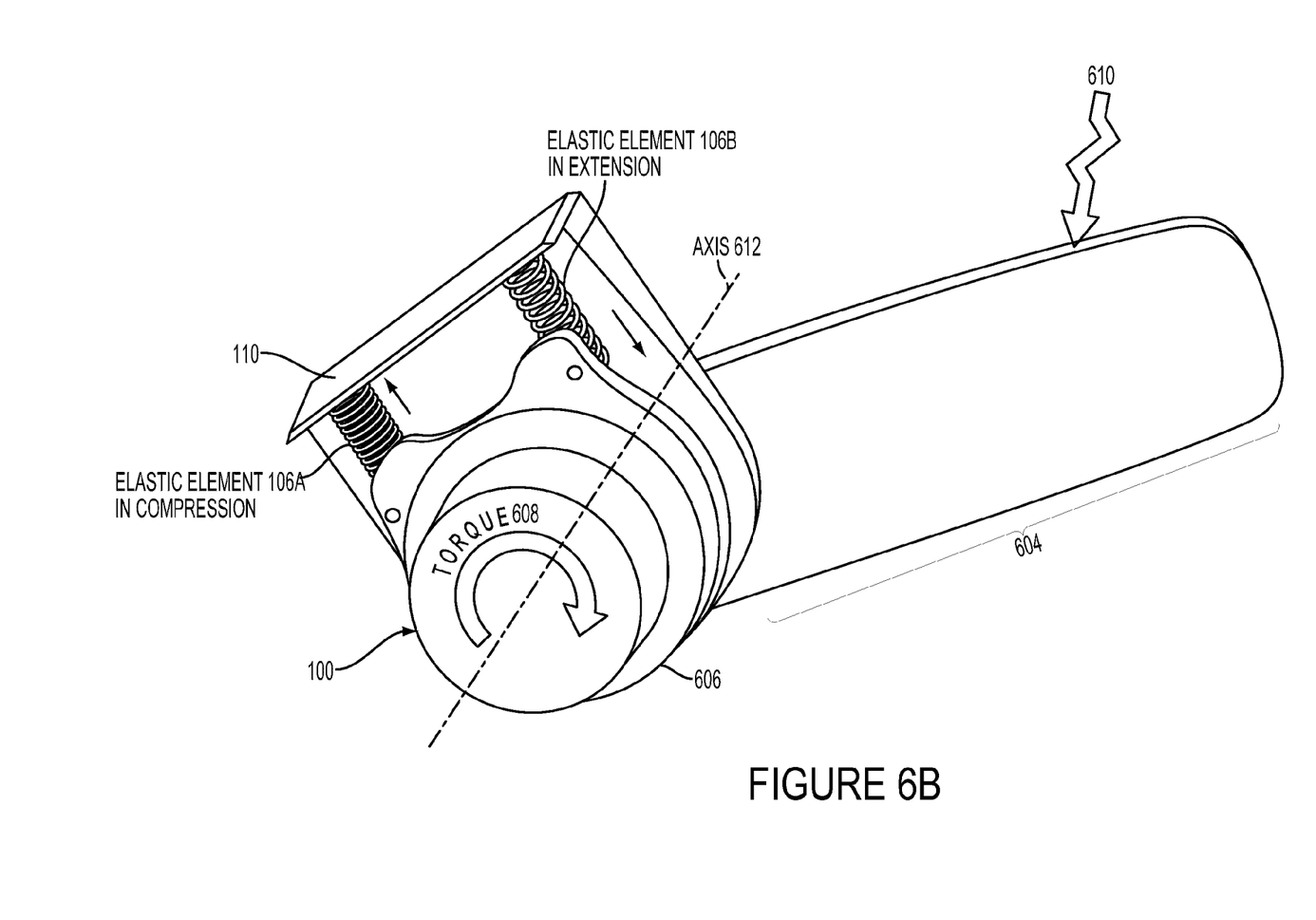
Figure 6C:
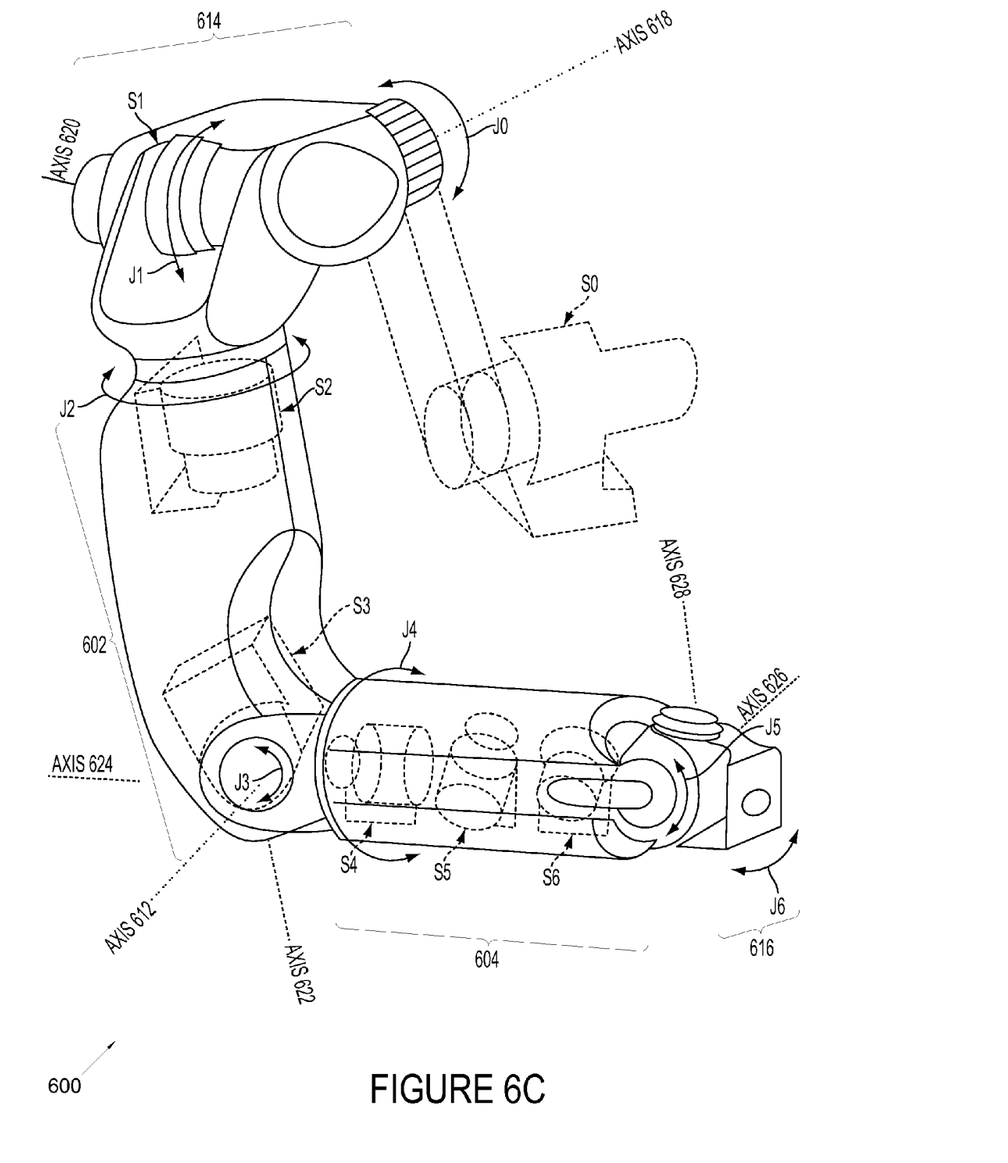

FIGS. 6A-6C show an example implementation of the rotary actuator 100 in a robotic system. FIG. 6A shows a robotic arm 600 that includes robotic arm links 602 and 604. In an example implementation, the rotary actuator 100 may be positioned at a joint of the robotic arm 600 such that the robotic arm link 604 rotates about the joint. More specifically, a housing of the rotary actuator 100 may be fixed to the robotic arm link 602 (i.e., ground) in any suitable manner (e.g., by connecting the ground plate 110). The robotic arm link 604 may be connected to an output plate of the rotary actuator 100 to allow for rotation of the robotic arm link 604 about the joint. Various mechanisms, such as screws, may be used to connect the robotic arm link 604 to the output plate.

The motor, the transmission assembly 102, and the output plate of the rotary actuator 100 collectively form an assembly 606. The assembly 606 may rotate when an external force is applied to the robotic arm link 604. The external force may be applied to the robotic arm link 604 at any angle and at any location on the robotic arm link. More specifically, the external force may cause an application of a torque 610 to the assembly 606. In some cases, as illustrated by FIG. 6A, the external force may be a shock load 610.

FIG. 6B shows a close up view of the rotary actuator 100 implementation presented in FIG. 6A. In particular, FIG. 6B shows how an application of the shock load 610 may be absorbed by the elastic elements 106A-106B (configured as the elastic element 106 described above). As mentioned above, the assembly 606 may rotate when an external force is applied to the robotic arm link 604. More specifically, the torque 610 may cause a clockwise rotation of the assembly 606 about axis 612 as illustrated by FIG. 6B. Note that, while not shown in FIG. 6B, the rotary actuator 100 may be connected to the robotic arm link 602.

As illustrated by the arrows, the clockwise rotation of the assembly 606 may cause a compression of one of the elastic elements 106A and an extension of the other elastic element 106B. The rotation of the assembly 606 may be damped by the elastic elements 106 such that significant oscillations caused by the shock load 610 are absorbed by the elastic elements 106. As a result, the elastic elements 106A-106B may provide compliance and protection for the rigid elements 104 (not shown in FIG. 6B), the sensors 108 (also not shown in FIG. 6B), and the assembly 606. Additionally, the sensors 108 may be configured to measure the force exerted by the application of the shock load 610.

FIG. 6C illustrates additional possible implementations of the rotary actuator 100 in the robotic arm 600. More specifically, a rotary actuator may be positioned at each joint of the robotic arm 600 to allow for movements of the robotic arm 600 at seven degrees of freedom. Additionally, the rotary actuators may enable sensing of externally applied forces (such as shock loads), sensing of the effort exerted by the actuators, and may provide compliance at each joint of the robotic arm 600. For instance, FIG. 6C shows seven joints J0-J6 accompanied by arrows that may illustrate the movement of various parts of the robotic arm 600 caused by actuation at the respective joint.

In one example, rotary actuator S0 (e.g., positioned inside a chest of a humanoid robot) may be configured to apply a rotational force at joint J0 and, as a result, may cause a rotation of robotic arm link 614 about axis 618. Such a rotation of robotic arm link 614 may result in a collective movement of the entire robotic arm 600. Additionally, an external force applied on the robotic arm 600 may result in a torque applied at the joint J0 that can be sensed by a sensor on the rotary actuator S0. Further, the rotary actuator S0 may provide compliance against shock loads.

In another example, rotary actuator S1 may be configured to apply a rotational force at joint J1 and, as a result, may cause a rotation of robotic arm link 602 about axis 620. Such a rotation of robotic arm link 602 may also result in a movement of robotic arm links 604 and 616. Additionally, an external force applied on the robotic arm 600 may result in a torque applied at the joint J1 that can be sensed by a sensor on the rotary actuator S1. Further, the rotary actuator S1 may provide compliance against shock loads.

In yet another example, rotary actuator S2 may be configured to apply a rotational force at joint J2 and, as a result, may cause a rotation of robotic arm link 602 about axis 622. Such a rotation of robotic arm link 602 may also result in a movement of robotic arm links 604 and 616. Additionally, an external force applied on the robotic arm 600 may result in a torque applied at the joint J2 that can be sensed by a sensor on the rotary actuator S2. Further, the rotary actuator S3 may provide compliance against shock loads.

In yet another example, rotary actuator S3 may be configured to apply a rotational force at joint J3 (e.g., as discussed above in association with FIGS. 6A-B) and, as a result, may cause a rotation of robotic arm link 604 about axis 612. Such a rotation of robotic arm link 604 may also result in a movement of robotic arm link 616. Additionally, an external force applied on the robotic arm 600 may result in a torque applied at the joint J3 that can be sensed by a sensor on the rotary actuator S3. Further, the rotary actuator S3 may provide compliance against shock loads.

In yet another example, rotary actuator S4 may be configured to apply a rotational force at joint J4 and, as a result, may cause a rotation of robotic arm link 604 about axis 624. Such a rotation of robotic arm link 604 may also result in a movement of robotic arm link 616. Additionally, an external force applied on the robotic arm 600 may result in a torque applied at the joint J4 that can be sensed by a sensor on the rotary actuator S4. Further, the rotary actuator S4 may provide compliance against shock loads.

In yet another example, rotary actuator S5 may be configured to apply a rotational force at joint J5 and, as a result, may cause a rotation of robotic arm link 616 about axis 626. Additionally, an external force applied on the robotic arm 600 may result in a torque applied at the joint J5 that can be sensed by a sensor on the rotary actuator S5. Further, the rotary actuator S5 may provide compliance against shock loads.

In yet another example, rotary actuator S6 may be configured to apply a rotational force at joint J6 and, as a result, may cause a rotation of robotic arm link 616 about axis 628. Additionally, an external force applied on the robotic arm 600 may result in a torque applied at the joint J6 that can be sensed by a sensor on the rotary actuator S6. Further, the rotary actuator S6 may provide compliance against shock loads. Other examples may also be possible and are not limited to a robotic arm.

III. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. A system comprising:
   a structure configured to receive a force based on application of a load to the structure;
   first and second rigid members each coupled to the structure, wherein the first rigid member is configured to provide a first deformation based on application of the load to the structure, and based on transfer of the force to the first rigid member, and wherein the second rigid member is configured to provide a second deformation based on application of the load to the structure, and based on transfer of the force to the second rigid member;
   a sensing element positioned on the first rigid member, wherein the sensing element is configured to measure the first deformation; and
   first and second shock absorbing members, wherein the first shock absorbing member is connected to the first rigid member such that the first rigid member is configured to further transfer the force to the first shock absorbing member, wherein the first shock absorbing member is configured to provide a third deformation under application of the load that is larger than the first deformation, wherein the second shock absorbing member is connected to the second rigid member such that the second rigid member is configured to further transfer the force to the second shock absorbing member, and wherein the second shock absorbing member is configured to provide a fourth deformation under application of the load that is larger than the second deformation.

2. The system of claim 1, further comprising:
   a feedback controller connected to the sensing element and the structure, wherein the feedback controller is configured to adjust application of the load to the structure based on a measurement of the first deformation by the sensing element.

3. The system of claim 1, wherein the structure comprises a rotary transmission assembly coupled to the first and second rigid member such that a rotation of the rotary transmission assembly causes a first linear deformation of the first rigid member by transfer of the force to the first rigid member and causes a second linear deformation of the second rigid member by transfer of the force to the second rigid member.

4. The system of claim 3, wherein the rotation of the rotary transmission assembly further causes a third linear deformation of the first shock absorbing member by further transfer of the force to the first shock absorbing member and causes a fourth linear deformation of the second shock absorbing member by further transfer of the force to the second shock absorbing member.

5. The system of claim 1, wherein the sensing element comprises a strain gauge.

6. The system of claim 1, wherein the shock absorbing member comprises a spring.

7. The system of claim 1, wherein the shock absorbing member comprises a bumper.

8. The system of claim 1, wherein the sensing element comprises a first sensing element, the system further comprising:
   a second sensing element positioned on the second rigid member, wherein the second sensing element is configured to measure the second deformation.

9. The system of claim 1, wherein the application of the load to the structure causes one of the first and second shock absorbing members to extend and the other one of the first and second shock absorbing members to compress.

10. A system comprising:
    a transmission assembly configured to rotate based on application of a load to the transmission assembly;
    first and second rigid members each comprising a material having a first elastic modulus, wherein the first and second rigid members are each coupled to the transmission assembly such that a rotation of the transmission assembly causes the first rigid member to provide a first deformation based on application of the load and causes the second rigid member to provide a second deformation based on application of the load;
    a sensing element positioned on the first rigid member, wherein the sensing element is configured to measure the first deformation; and
    first and second elastic elements each comprising a material having a second elastic modulus that is lower than the first elastic modulus, wherein the first elastic element is connected to the first rigid member such that the rotation of the transmission assembly causes the first elastic element to provide a third deformation based on application of the load, wherein the second elastic element is connected to the second rigid member such that the rotation of the transmission assembly causes the second elastic element to provide a fourth deformation based on application of the load.

11. The system of claim 10, wherein the first and second elastic elements comprise first and second shock absorbing members.

12. The system of claim 10, wherein the third deformation is larger than the first deformation, and wherein the fourth deformation is larger than the second deformation.

13. The system of claim 10, further comprising:
    a plate connected to the first and second elastic elements, wherein the plate is configured for coupling to a robot link.

14. The system of claim 10, wherein the transmission assembly comprises an output plate, and wherein the system further comprises:
    a robot link coupled to the output plate, wherein the load is applied to the robot link.

15. The system of claim 10, further comprising:
    a controller connected to the sensing element; and
    a motor connected to the transmission assembly and coupled to the controller such that the motor is configured to apply a torque to the transmission assembly based on a measurement of the first deformation by the sensing element.

16. The system of claim 10, wherein the sensing element comprises a first sensing element, the system further comprising:

a second sensing element positioned on the second rigid member, wherein the second sensing element is configured to measure the second deformation.

17. The system of claim 10, wherein the rotation of the transmission assembly causes one of the first and second elastic elements to extend and the other one of the first and second elastic elements to compress.

18. A system comprising:

a motor configured to apply a torque;

a transmission assembly connected to the motor such that the transmission assembly is configured to rotate based on an application of the torque by the motor;

a plurality of rigid members comprising a material having a first elastic modulus, wherein the rigid members are coupled to the transmission assembly such that a rotation of the transmission assembly causes the transmission assembly to transfer a force to the rigid members based on application of the torque;

a plurality of sensors each positioned on one of the rigid members such that each sensor is configured to measure a deformation of one of the rigid members; and a plurality of shock absorbing members each connected to one of the rigid members such that the rigid members are configured to further transfer the force to the shock absorbing members, wherein the shock absorbing members comprise a material having a second elastic modulus, and wherein the first elastic modulus is higher than the second elastic modulus.

19. The system of claim 18, further comprising:

a robot link coupled to the transmission assembly such that the rotation of the transmission assembly causes a movement of the robot link.

20. The system of claim 18, wherein the sensor is configured to convert a measurement of the deformation to a measurement of a rotary deflection of the transmission assembly.

* * * * *